United States Patent [19]

Miyairi et al.

[11] Patent Number: 4,725,783

[45] Date of Patent: Feb. 16, 1988

[54] CABLE CONNECTION HEAD FOR A WELL LOGGING CABLE USEFUL AT HIGH TEMPERATURES

[75] Inventors: Makoto Miyairi, Musashino; Toshinobu Itoh, Kamakura, both of Japan

[73] Assignee: Sekiyushigen Kaihatsu Kabushiki Kaisha, Tokyo, Japan

[21] Appl. No.: 893,014

[22] Filed: Aug. 4, 1986

[30] Foreign Application Priority Data

Aug. 19, 1985 [JP] Japan ................. 60-180574

[51] Int. Cl.$^4$ ............. G01V 3/18; E21B 49/00; H02G 15/08

[52] U.S. Cl. ................. 324/347; 73/152; 166/65.1; 174/75 R; 174/76

[58] Field of Search ............. 324/323, 347, 366; 73/151, 152; 174/74 R, 75 R, 76, 79; 166/64, 65.1, 66

[56] References Cited

U.S. PATENT DOCUMENTS

| | | | |
|---|---|---|---|
| 2,562,880 | 8/1951 | Andrew | 174/74 R X |
| 2,779,915 | 1/1957 | Moon | 324/347 |
| 3,047,795 | 7/1962 | Pearson | 324/347 |
| 3,233,202 | 2/1966 | Kyle | 174/75 R X |
| 3,573,346 | 4/1971 | Appleby | 174/76 X |
| 3,816,641 | 6/1974 | Iversen | 174/76 |
| 4,096,752 | 6/1978 | Tonnelli | 174/89 X |

*Primary Examiner*—Gerard R. Strecker
*Attorney, Agent, or Firm*—George B. Oujevolk

[57] ABSTRACT

A cable connection head is disclosed, in which a well logging cable is inserted through an upper head housing of a head housing consisting of a lower head housing coupled to an upper portion of a measuring instrument housing and the upper head housing coupled to an upper portion of the lower head housing, armoring wires of the well logging cable secured to the upper head housing, and core wires of the well logging cable are connected to a connector which is fittedly secured to the lower head housing. A metal covered cable of the well logging cable is constructed by accommodating a plurality of core wires and filling with an electric insulating material in a metal tube. The lower head housing and metal covered cable are reliably sealed to each other such as to be able to withstand high temperature by inserting the metal tube of the metal covered cable through the lower head housing and securing the metal tube by means of welding around the entire outer periphery to the top of the lower head housing. An end portion of the metal tube extends into a recess of the lower head housing. The recess is filled with a ceramic material covering the accommodated end portion of the metal tube with the electric insulating material.

5 Claims, 11 Drawing Figures

FIG. 1
FIG. 2
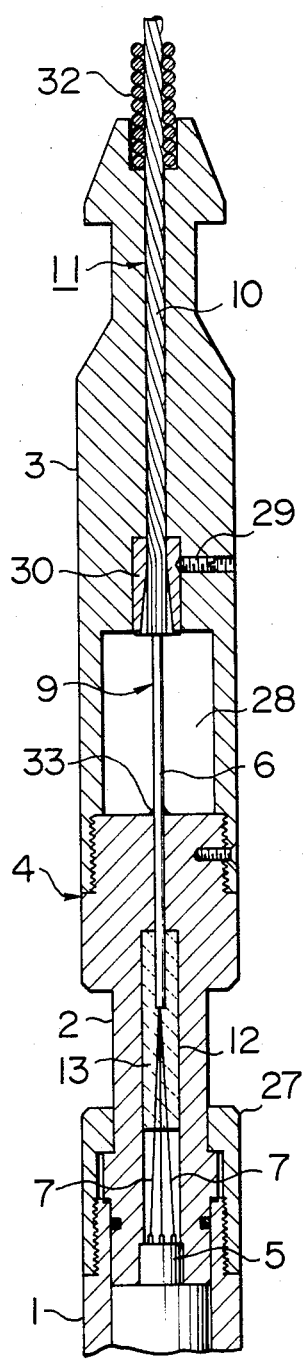
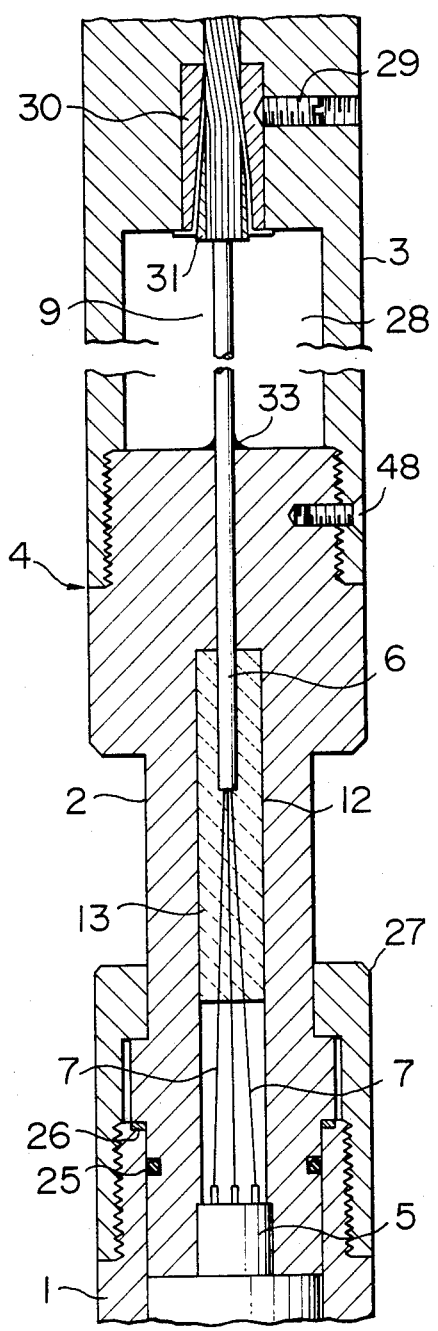

F I G. 3
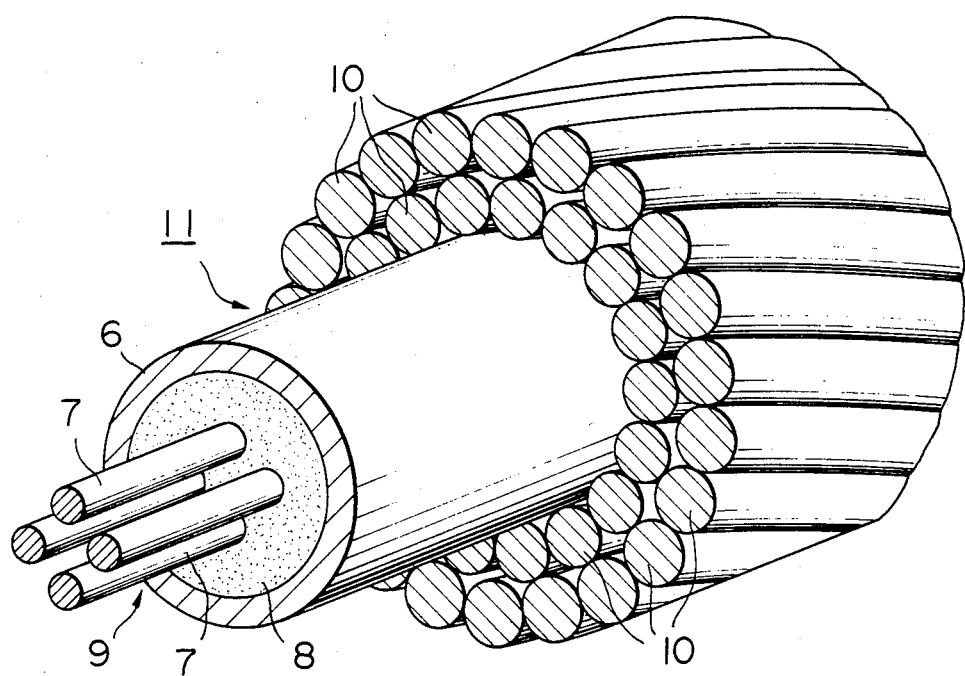

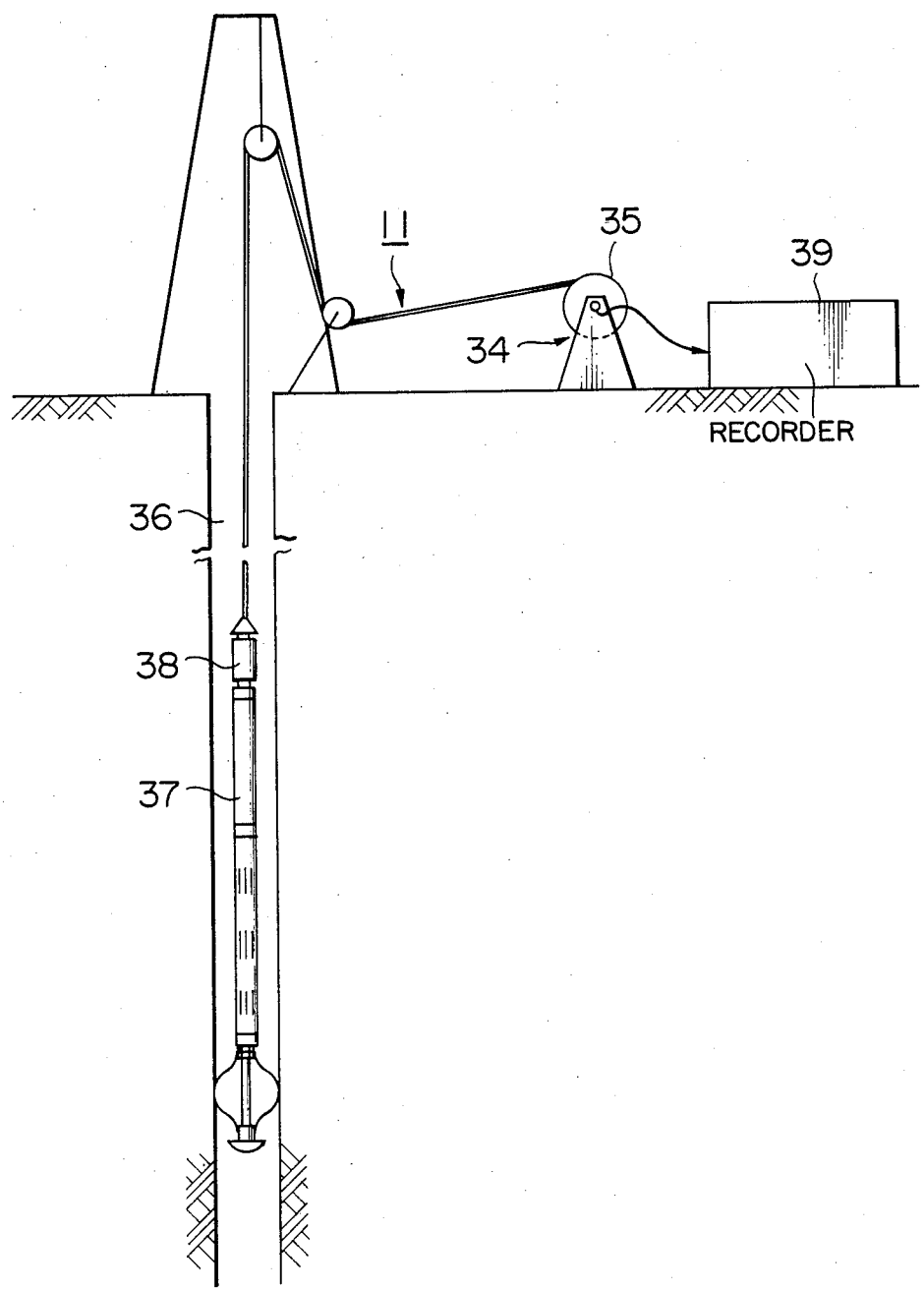
F I G. 4

FIG. 5
FIG. 6
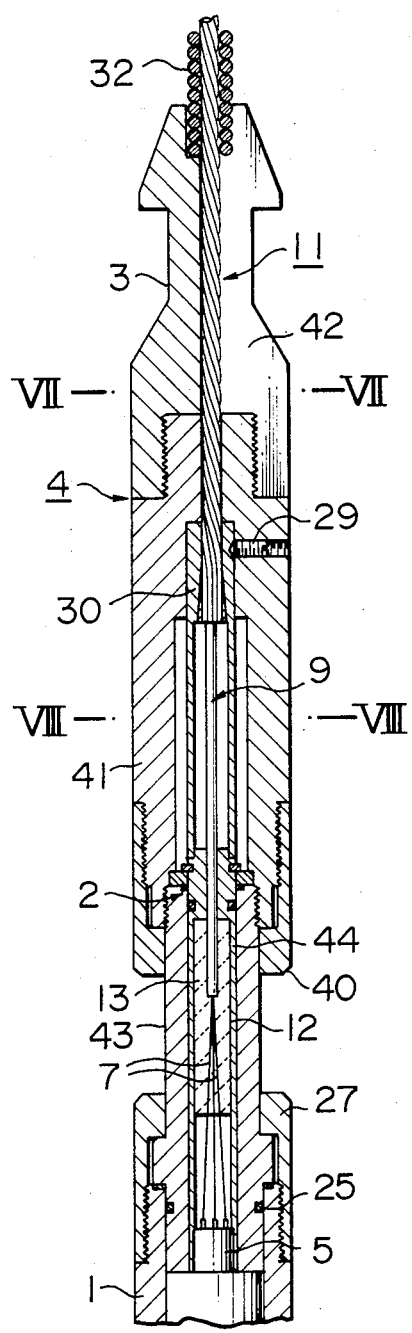
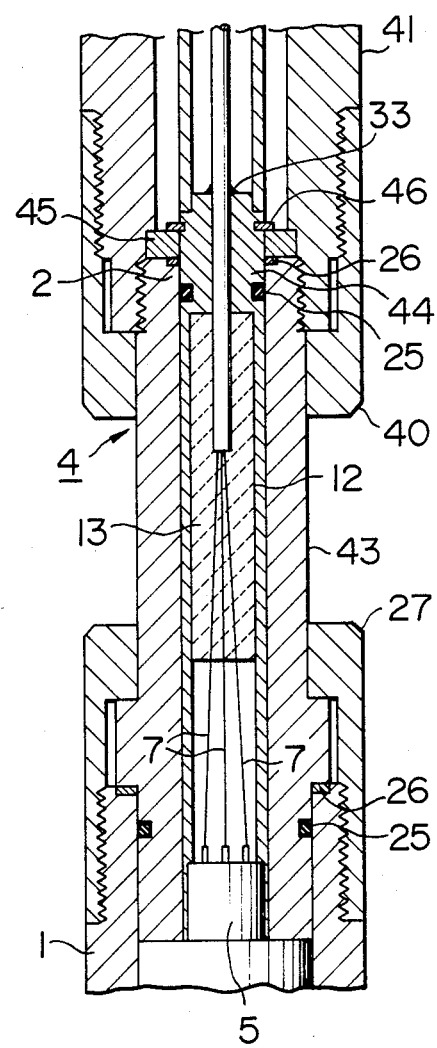

CABLE CONNECTION HEAD FOR A WELL LOGGING CABLE USEFUL AT HIGH TEMPERATURES

BACKGROUND OF THE INVENTION

1. Field of the Invention

This invention relates to a cable connection head for high temperature purposes, which is used to connect a well logging cable and a measuring instrument when lowering various measuring instruments in a well such as a petroleum well and a geothermal well.

2. Description of the Prior Art

In petroleum wells and geothermal wells, well logging is often performed to determine the physical properties of the strata by electrical well logging or acoustic well logging and also determine the properties of the product by flow rate well logging or pressure well logging. For such measurements, it is necessary to lower various measuring instruments (such as well logging sonde) in the well by connecting the instruments to cables. Cable connection heads are used to mechanically and electrically connect the cable and measuring instrument.

The cable connection head consists of three basic elements, i.e., (1) a securement section, to which ends of armoring wires of a well logging cable are secured, (2) a section, in which core wires of the well logging cable are introduced into a head housing, and (3) a connector section, in which the head is connected to the measuring instrument. Of these sections, the section, in which the core wires of the well logging cable are introduced into the head housing, is most important and difficult because it requires water tightness.

A well-known cable head for the purpose noted above has a construction as shown in FIGS. 9 to 11. As is shown, a covered cable 18 is constructed by winding a tape 17 to cover a plurality of covered core wires, each of which consists of a core wire 15 and a polymer cover 14, and a glass fiber 16 intervening between adjacent covered core wires. A well logging cable 19 is constructed by winding a plurality of armoring wires 10 on the outer side of the covered cable 18. The well logging cable 19 is inserted through an upper head housing 3 of a head housing 4, which has a lower head housing 2 coupled to an upper portion of a measuring instrument housing 1 and the upper head housing 3 coupled to an upper portion of the lower head housing 2. The armoring wires 10 of the well logging cable 19 are secured to the upper head housing 3. A plurality of hermetic connectors 20 are secured to the top of the lower head housing 2. Each core wire 15 of the covered cable 18 is connected to one end of each hermetic connector 20. The other end of each hermetic connector 20 is connected by a lead 21 to each terminal of a connector 5 fitted in a lower end portion of a recess 12 of and secured to the lower head housing 2. The connection section between the hermetic connectors 20 and the leads 21 is sealed with a boot 22 made of fluorine-contained rubber in order to prevent intrusion of water into the inside of the hermetic connector 20. Silicone rubber 24 is injected into a connector accommodation chamber 23 in the upper head housing 3 through an injection port 47 to enhance the seal effect. The injection port 47 is then provided with a lid.

The seal property of the above prior art cable connection head at high temperature is determined by the heat resistance of the hermetic connectors 20, fluorine-contained rubber boot 22 and silicone rubber 24. The upper limit of the heat resistance is approximately 270° C., and the head can not be used in high temperature circumstances beyond this temperature. Further, with the prior art cable connection head the minimum diameter is determined by the diameter and number of the hermetic connectors 20. Therefore, it is difficult to manufacture a small diameter cable connection head.

SUMMARY OF THE INVENTION

A first object of the present invention is to provide a cable connection head, in which a well logging cable is inserted through an upper head housing of a head housing consisting of a lower head housing coupled to an upper portion of a measuring instrument housing and the upper head housing coupled to an upper portion of the lower head housing, armoring wires of the well logging cable are secured to the upper head housing, and core wires of the well logging cable are connected to a connector which is fittedly secured to the lower head housing, a metal covered cable of the well logging cable is constructed by accommodating a plurality of core wires and filling with an electric insulating material in a metal tube, and the lower head housing and metal covered cable are reliably sealed to each other such as to be able to withstand high temperature by inserting the metal tube of the metal covered cable through the lower head housing and securing the metal tube by means of welding around the entire outer periphery to the top of the lower head housing.

A second object of the present invention is to provide a reliable seal for an end portion of the metal tube, electric insulating material and core wires of the metal covered cable such as to be able to withstand high temperature by disposing the end portion of the metal tube in a recess of the lower head housing, filling the recess with a ceramic material covering the accommodated end portion of the metal tube with the electric insulating material and sintering the ceramic material.

A third object of the present invention is to permit ready manufacture of a small diameter cable connection head for high temperature purposes without accommodating hermetic connectors in the head housing.

A fourth object of the present invention is to facilitate the disassembly and reassembly of the cable connection head without cutting the well logging cable with an arrangement, in which the head housing consists of a lower head housing coupled to an upper end portion of a measuring instrument housing, an intermediate head housing screwed on an upper end portion of the lower head housing and secured to the lower head housing by a coupling nut and an upper head housing screwedly coupled to an upper end portion of the intermediate head housing, the upper head housing is provided with a slit, through which the well logging cable is inserted sidewise, the intermediate head housing consists of two halves bonded together sidewise, and the lower head housing consists of a lower head housing body having a through bore and a metal sleeve fitted in the lower head housing body.

The above-mentioned and other objects and features of the invention will become apparent from the following detailed description taken in conjunction with the drawings which indicate embodiments of the invention.

BRIEF DESCRIPTION OF THE DRAWINGS

FIGS. 1 to 3 illustrate a first embodiment of the present invention, in which:

FIG. 1 is a longitudinal sectional view showing a cable connection head for high temperature purposes;

FIG. 2 is a longitudinal sectional view, to an enlarged-scale, showing part of FIG. 1; and FIG. 3 is a fragmentary perspective view showing a well logging cable;

FIG. 4 is a sectional view showing a state in which a measuring instrument is suspended in a well using the first embodiment of the cable connection head according to the present invention;

FIGS. 5 to 8 illustrate a second embodiment of the present invention, in which:

FIG. 5 is a longitudinal sectional view showing the cable connection head for high temperature purposes;

FIG. 6 is a longitudinal sectional view, to an enlarged-scale, showing part of FIG. 5;

FIG. 7 is a sectional view taken along line VII—VII in FIG. 5; and

FIG. 8 is a sectional view taken along line VIII—VIII in FIG. 5;

DETAILED DESCRIPTION OF THE PREFERRED EMBODIMENTS

Figure 7:
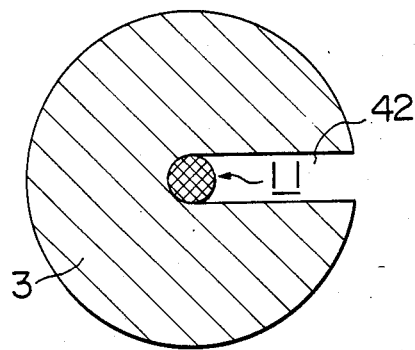

FIGS. 1 to 3 illustrate a first embodiment of the present invention. A lower end portion of a lower head housing 2 made of a metal is fitted in an upper end portion of a measuring instrument housing 1 made of a metal in various measuring instruments (well logging sonde) to be lowered in a well, with an O-ring 25 made of fluorine-contained rubber interposed between the engaged portions of the housings 1 and 2. Between an outer flange provided on a lower portion of the lower head housing 2 and the top of the measuring instrument housing 1 there is provided an intervening O-ring 26 made of a metal softer than the materials of the housings 1 and 2. A lower portion of the lower head housing 2 is secured to an upper portion of the measuring instrument housing 1 by a coupling nut 27 screwed on an upper end portion of the measuring instrument housing 1. A lower end portion of an upper head housing 3 is screwedly coupled by screw 48 to an upper end portion of the lower head housing 2. The lower and upper head housings 2 and 3 constitute a head housing 4.

The lower head housing 2 has a recess 12 or a circular bore open at the bottom. A lower portion of the upper head housing 3 is provided with a recess 28 open at the bottom.

A metal covered cable 9 is constructed by accommodating a plurality of (e.g., four) core wires 7 in a spaced-apart relation to one another and filling with an electric insulating material 8 consisting of magnesium oxide powder in a metal tube 6 made of such metal as stainless steel or inconel. A well logging cable 11 is constructed by winding a plurality of armoring wires 10 on the outer periphery of the metal covered cable 9. The well logging cable 11 is inserted through a central bore of the upper head housing 3 and a sleeve 30, which is fitted in a central portion of the upper head housing 3 and secured by an anti-rotation screw 29 thereto. The sleeve 30 has a conical bore flaring downwards. The lower ends of the armoring wires 10 of the well logging cable 11 are intervened between the sleeve 30 and slit sleeve-like wedge pieces 31 disposed at the inner side of the sleeve 30 and are urgedly secured to the sleeve 30 by the wedge pieces 31. A lower end portion of a protective helical spring 32, which is penetrated by the well logging cable 11, is fitted in an upper end portion of the upper head housing 3.

The metal covered cable 9 in the well logging cable 11 extends through the central bore of the lower head housing 2. The metal tube 6 in the metal covered cable 9 is sealedly secured over the entire outer periphery by means of welding 33 to the top of the lower head housing 2. An end portion of the metal tube 6 with the electric insulating material 8 in the metal covered cable 9 extends into the recess 12 of the lower head housing 2. The recess 12 is filled with a ceramic material 13 covering an end portion of the metal tube 6 with the electric insulating material 8. The ceramic material 13 is sintered. The core wires 7 of the metal covered cable 9 are connected to a connector 5 which is connected to a connector in the measuring instrument. The connector 5 is fitted in a lower end portion of the recess 12 of and secured to the lower head housing 2.

FIG. 4 shows the first embodiment of the cable connection head in use to suspend a measuring instrument in a well, e.g., a petroleum well, a geothermal well, etc. A measuring instrument 37 which is disposed in a well 36 is coupled by a cable connection head 38 to a pay-off end of the well logging cable 11 paid off a drum 35 of a winch 34 provided on the ground. The end of the well logging cable 11 wound on the drum is connected to a recorder 39 on the ground by way of a relay brush (not shown) mounted on a drum shaft.

Figure 8:
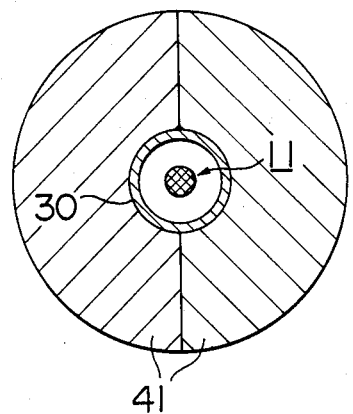
Figure 9:
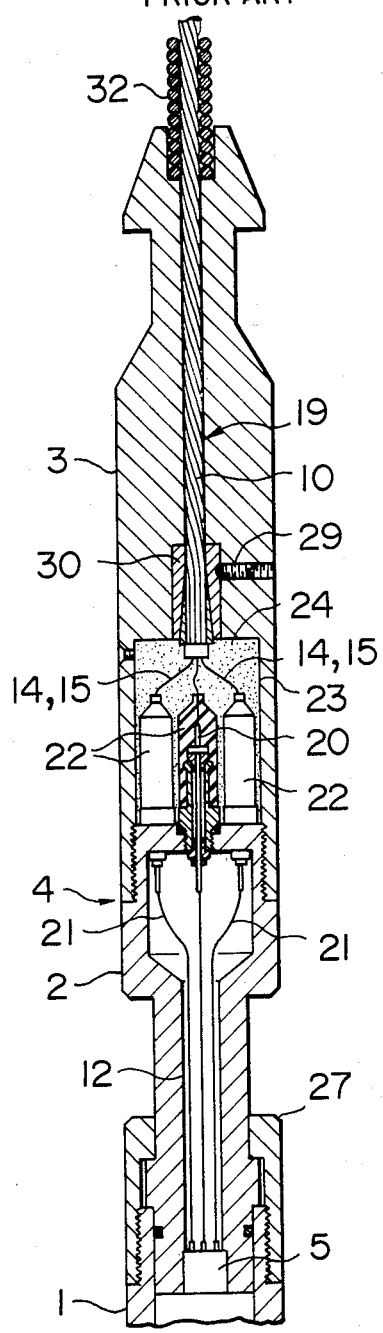
FIG. 9 is a longitudinal sectional view showing a prior art cable connection head.
Figure 10:
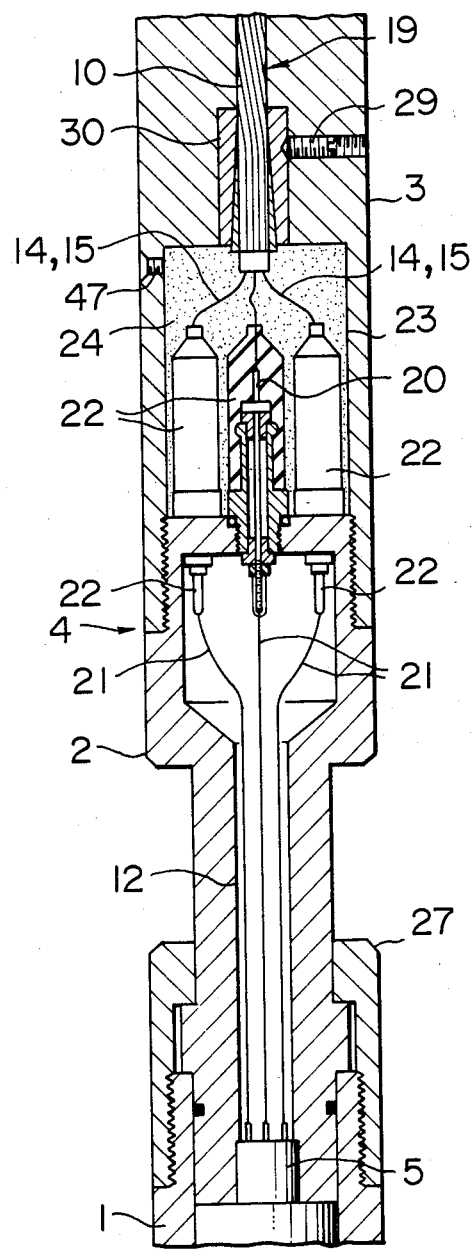
FIG. 10 is a longitudinal sectional view, to an enlarged-scale, showing part of FIG. 9.
Figure 11:
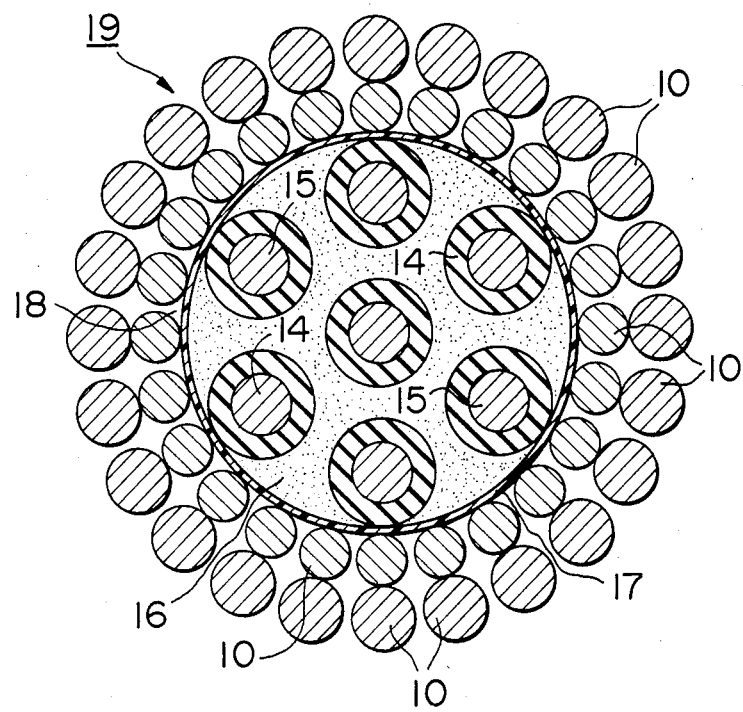
FIG. 11 is a sectional view showing the well logging cable used for the prior art cable connection head.

FIGS. 5 to 8 show a second embodiment of the present invention. In this instance, the head housing 4 comprises the lower head housing 2 coupled to an upper end portion of the measuring instrument housing 1, an intermediate head housing 41 screwed on an upper end portion of the lower head housing 2 and secured to the same by a coupling nut 40 and the upper head housing 3 screwedly coupled to an upper end portion of the intermediate head housing 41. The upper head housing 3 is provided with a slit 42, through which the well logging cable 11 is inserted sidewise. The intermediate head housing 41 consists of two halves which can be bonded together sidewise. The lower head housing 2 consists of a lower head housing body 43 having through bore and a metal sleeve 44 fitted in the lower head housing body 43.

The fluorine-contained rubber O-ring 25 is interposed between the sleeve 44 and the lower head housing body 43. The metal O-ring 26 is interposed between a metal back plate 45 fitted on the outer periphery of the metal sleeve 44 and the top of the lower head housing body 43. A snap ring 46 is fitted on the sleeve 44 and is in contact with the top of the metal back plate 45. The metal covered cable 9 in the well logging cable 11 penetrates the sleeve 44. The outer periphery of the metal tube 6 in the metal covered cable 9 is secured by means of welding to the top of the sleeve 44. The rest of the construction is the same as in the first embodiment.

Heretofore, for performing well logging by sealing the top of a well pipe, a cable seal device is secured to the top of the well pipe after inserting the well logging cable through the cable seal device, thereby preventing a jetting of fluid in the well through space between the well pipe and the well logging cable. Heretofore, the insertion of the well logging cable in the cable connection head through the cable seal device has required a process of cutting the well logging cable and separating it from the cable head, then inserting the well logging cable through the cable seal device and then assembling again the cable connection head.

In the case of the second embodiment, it is possible to remove the upper head housing 3, intermediate head housing 41, lower head housing body 43, etc. from the metal sleeve 44 without cutting the well logging cable 11, then inserting the sleeve 44 through the cable connection head.

It is to be observed therefore, that the present invention provides for an improvement in an arrangement for a cable connection head for high temperature purposes in which a cable assembly including armoring wires is inserted through an upper head housing 3 of a connection head housing 4 having a lower head housing 2 coupled to the upper portion of a measuring instrument 1 which is to be lowered into a well. The upper head housing 3 is in turn coupled to an upper portion of said lower head housing 2. The armoring wires of the cable assembly are secured to the upper head housing 3 and core wires of said cable assembly are connected to a connector 5 which is fitted in and secured to said lower head housing 2. The improvement consists of the cable assembly, including the armoring wires being a metal covered cable 9 contained in a metal tube, accommodating therein a plurality of core wires 7. The metal tube 6 is filled with an electrical insulating material 8. A well logging cable 11 consisting of a plurality of armoring wires 10 is wound on the outer periphery of the metal covered cable 9. This metal tube 6 is inserted through the lower head housing 2 and the metal tube 6 is welded by weld 33 around the entire outer periphery of the top of the lower head housing 2. The lower head housing 2 has a recess 12 and an end portion of metal tube 6 extends into this recess 12. Also, This recess 12 is filled with an electrical insulating material sintered with ceramic material 13 completely covering the accommodated end portion of the metal tube 6. An outer flange is provided on a lower portion of the lower head housing 2, with a first O-ring 26 made of a metal softer than the materials of both the connection head housing and the instrument housing interposed between said two housings also a second O-ring made of a fluorine-contained rubber is interposed between said two housings. The lower portion of the lower head housing 2 is secured to the upper portion of the instrument housing 1 by a coupling nut 27 and, the lower portion of the upper head housing 3 is threadly secured by an anti-rotation screw 29.

A sleeve 30 is defined in an upper central bore of the upper head housing 3, said sleeve 30 having a conical bore flaring downwards, and slit-like wedge pieces 31 in the sleeve. The lower ends of the armoring wires of the well logging cable 10 intervene between the sleeve 30 and the wedge pieces 31. A protective helical spring 32 is interposed between the cable assembly and the upper head housing 3.

It is also possible to have an intermediate head housing 41 screwed on the upper end portion of said lower head housing 2 and secured to the lower head housing by a coupling nut 40. The upper head housing 3 is threadly coupled to the upper end portion of this intermediate head housing 41. There is a slit 42 in the upper head housing 3 through which the well logging cable 11 can be inserted sidewise. The intermediate head housing 41 consists of two halves bonded together sidewise and, the lower head housing 2 consists of a lower head housing body 43 having a through bore and a metal sleeve 44 fitted in the lower head housing body 43.

What is claimed is:

1. In an arrangement for a cable connection head for high temperature purposes in which a cable assembly, including outer armoring wires and inner core wires, is inserted through an upper head housing (3) of a connection head housing (4) having a lower head housing (2) including an outer periphery, coupled to the upper portion of a measuring instrument (1), which is to be lowered into a well, and, said upper head housing (3) is coupled to an upper portion of said lower head housing (2), also, where said armoring wires are secured to said upper head housing (3) and said core wires are connected to a connector (5) which is fitted in and secured to said lower head housing (2), the improvement therein consisting of:
   (a) said core wires are part of a metal covered cable (9) encased in a metal tube (6) having an outer periphery, said metal tube accommodating therein a plurality of said core wires (7), and said tube is filled with an electrical insulating material (8);
   (b) a plurality of said armoring wires (10) are wound around said tube outer periphery so as to form a well logging cable (11);
   (c) said metal tube (6) being inserted through said lower head housing (2) and said metal tube being weldedly secured around the entire periphery of the upper portion of said lower head housing (2);
   (d) said lower head housing (2) having a recess (12) wherein an end portion of said metal tube (6) extends into said recess (12); and,
   (e) said recess (12) is filled with an electrical insulating material sintered with ceramic material (13) completely covering said accommodated end portion of said metal tube (6).

2. In an arrangement as claimed in claim 1, an outer flange provided on a lower portion of the lower head housing (2), with a first o-ring (26) made of a metal softer than the materials of both the connection head housing and the instrument housing interposed between said two housings also a second o-ring of a fluorine-contained rubber interposed between said two housings.

3. In an arrangement as claimed in claim 2, the lower portion of the lower head housing (2) being secured to the upper portion of the instrument housing (1) by a coupling nut (27) and, the lower portion of the upper head housing (3) being threadly secured to the upper end portion of the lower head housing (2), said portions being secured by an anti-rotation screw (29).

4. In an arrangement as claimed in claim 3, a sleeve (30) defined in an upper central bore of the upper head housing (3), said sleeve (30) having a conical bore flaring downwards, and slit sleeve-like wedge pieces (31) in said sleeve (30), the lower ends of the armoring wires of the well logging cable (11) being caused to intervene between the sleeve (30) and said wedge pieces (31), a protective helical spring (32) interposed between said cable assembly and the upper head housing (3).

5. In an arrangement as claimed in claim 1, an intermediate head housing (41) screwed on the upper end portion of said lower head housing (2) and secured to said lower head housing (2) by a coupling nut (40), the upper head housing (3) being threadly coupled to the upper end portion of said intermediate head housing (41), a slit (42) in said upper head housing (3) through which the well logging cable (11) is inserted sidewise, said intermediate head housing (41) consisting of two halves bonded together sidewise and, said lower head housing (2) consisting of a lower head housing body (43) having a through bore and a metal sleeve (44) fitted in said lower head housing body (43).

* * * * *